Figure 1:
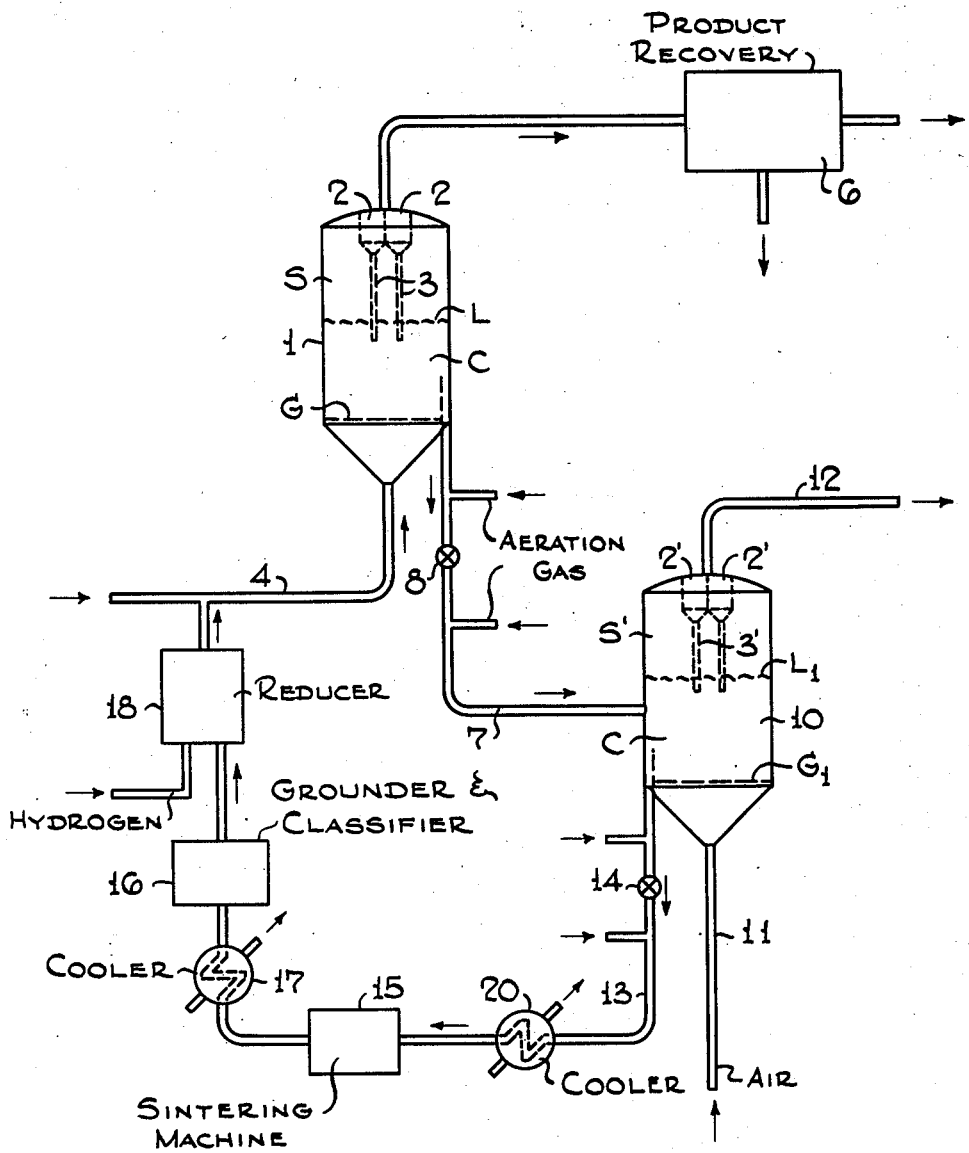
Figure 2:
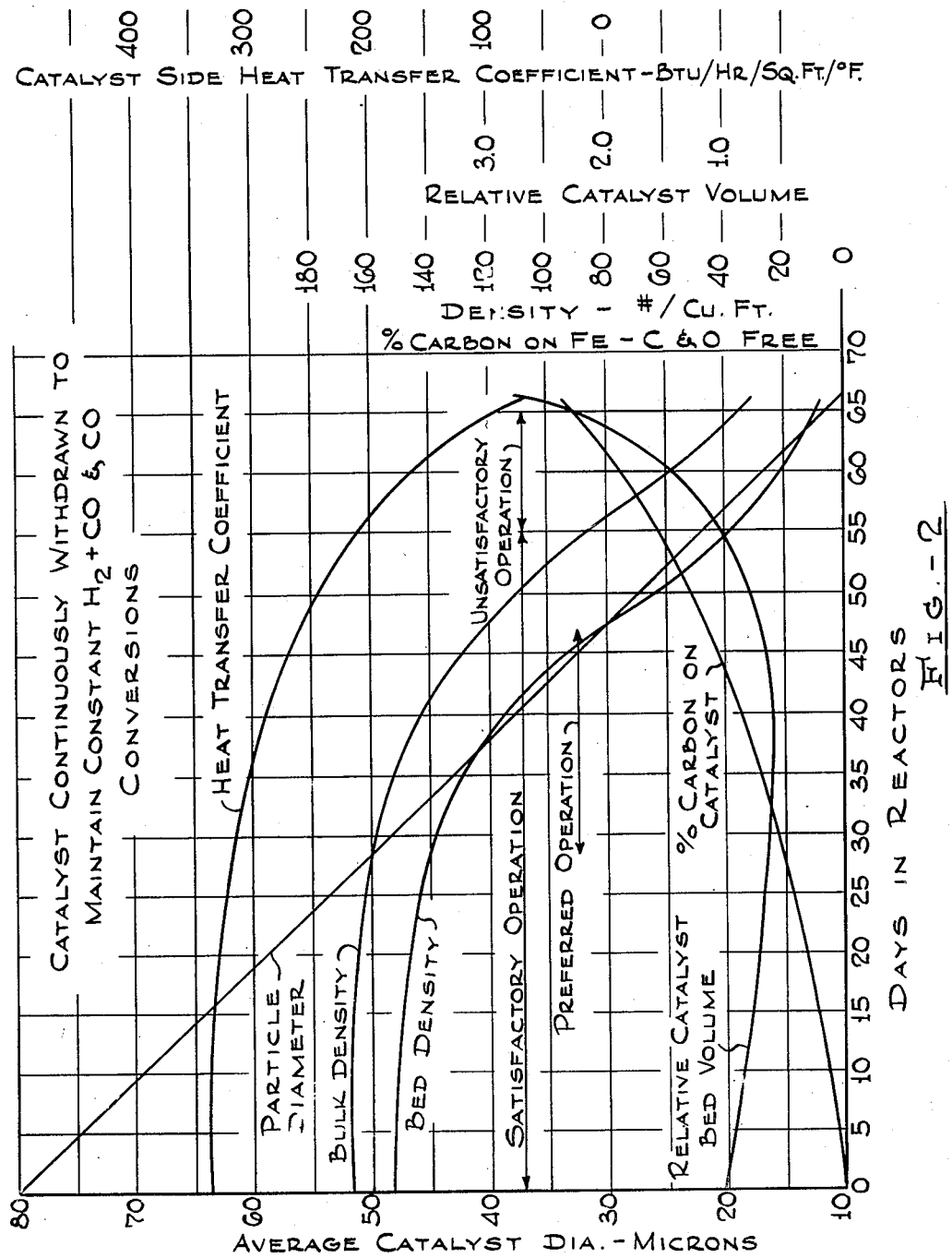

Patented June 16, 1953

2,642,448

UNITED STATES PATENT OFFICE 2,642,448

HYDROCARBON SYNTHESIS

Ivan Mayer, Summit, N. J., and Virginia C. Johnson, Knoxville, Tenn., assignors to Standard Oil Development Company, a corporation of Delaware Application November 16, 1948, Serial No. 60,312

7 Claims. (Cl. 260—449.6)

The present invention relates to improvements in the operation of a hydrocarbon synthesis plant. More particularly, it relates to improvements in the operation of a hydrocarbon synthesis process employing fluidized catalyst technique so that normally liquid hydrocarbons and oxygenated hydrocarbons can be manufactured from carbon monoxide and hydrogen more economically and efficiently than has heretofore been possible.

The synthesis of hydrocarbons from carbon monoxide and hydrogen is a matter of record. The Fischer-Tropsch synthesis for hydrocarbons has been described in patents and other technical literature. A study of this literature reveals that in the early history of this particular art, hydrocarbons were synthesized by contacting them at elevated temperatures with a cobalt-containing catalyst. It shows also that later, iron-containing promotional amounts of activators, such as $K_2CO_3$ was employed as the catalyst and that the temperatures in this later developed process were somewhat higher than in the cobalt process. More recently a great deal of laboratory and pilot plant experimentation has been carried out in this country with the object in view of applying fluid catalyst technique to the hydrocarbon synthesis process. For example, a considerable amount of research work has been and is now being carried out employing powdered iron as a catalyst in the synthesis of hydrocarbons from gaseous mixtures containing carbon monoxide and hydrogen. It has been found that the iron-employing process yields a gasoline fraction of improved antidetonation quality.

The present invention goes to the matter of improving the fluidized catalyst technique as applied to hydrocarbon synthesis from carbon monoxide and hydrogen where the catalyst is powdered iron. Research in laboratory and pilot plant operation has revealed that the reaction between carbon monoxide and hydrogen results in the deposition of carbonaceous material on the powdered iron catalyst, and the forces accompanying such deposition cause fragmentation and/or disintegration of the catalyst to particle sizes which can not be well fluidized. In other words, the synthesis of hydrocarbons as indicated above has presented to the industry problems with which they were not confronted in the development of the catalytic cracking of hydrocarbon oils employing the fluid catalyst technique.

It has now been discovered that, in order to maintain a well fluidized bed of iron catalyst in a reaction zone, the particle size and the particle size distribution should be maintained within fairly well-defined limits. In the first place, the smaller the particle size, the greater surface area presented to the reacting gasiform material and, as a result of the use of fine material, higher throughputs and shorter times of contact between gasiform reactants and catalyst are allowable for a given conversion or yield. But the material which contains an excess of fines, say particles having an average size below 30 microns results in a state wherein, operating at the usual gas velocities, say about 1–1½ feet per second, the resulting fluidized mass does not exhibit good fluidized catalyst characteristics, such as good heat transfer characteristics, and temperature control is therefore difficult. Another difficulty attending the operation of a hydrocarbon synthesis process when the catalyst contains too large a quantity of fines is that, because of over-conversion due to large surface area per weight of catalyst gas throughput must be increased, and the entrainment overhead in the issuing gasiform material is too great, or in other words, catalyst is blown out of the reactor. The best method of operating the fluid catalyst system is to maintain a dense fluidized mass within the reactor and also, within the reactor, to effect a separation of gasiform material from the dense fluidized mass in the upper portion of said reactor so that the gases and/or vapors issuing from the reactor are substantially freed of entrained material. If the quantity of fines in the reaction zone is inordinately large it is difficult, if not impossible, to prevent serious entrainment in the exiting gases and/or vapors. In addition to the foregoing, it may also be pointed out that unless an upper limit of the particle size and the distribution of the powdered iron catalyst is maintained, there is grave danger that the bed of fluidized catalyst would not be well fluidized or that there would be economically undesirable pressure drops within the bed, that the upper level of the dense fluidized mass will tend to surge rather than remain substantially level or constant, that the required bed volume for a given desired conversion will be in excess of that necessary for economically designed equipment, and the process would otherwise operate unsatisfactorily.

Attempts have been made to counteract the disadvantage of having too great a quantity of fines present in the reaction zone by continuously adding particles of larger size than ordinarily used, which break down or disintegrate during the operation. The catalyst is meanwhile withdrawn continuously or at frequent intervals, and either treated with air to remove carbonaceous material or sintered to accomplish the same purpose and returned to the reaction zone substantially carbon free. In other words, usually the particle size of the catalyst is maintained within the limits of 0–200 microns with a preponderance of the catalyst having a particle size of greater than 40 microns. In the proposal referred to, catalyst having a particle size of, say, 100–200 microns is continuously or at frequent intervals, added to the reaction zone while a corresponding weight of catalyst is withdrawn at the same rate that catalyst is added, sintered, ground and returned to the reaction zone. In other words, carbonaceous material is not permitted to build up on the catalyst to any substantial degree, and physical disintegration or fragmentation thereof is minimized. However, since the particle size of the catalyst in the reactor is maintained in the upper ranges, a given weight of catalyst will obviously not have the same surface as if the average particle size were smaller, and conversions and/or yields will be lowered for a given set of operating conditions, such as temperature, pressure, feed rate, etc.

It has now been found that there is a critical relationship between average particle size and fluidized bed density, bed volume, and gas throughput, so that a constant conversion may be obtained and yet the heat transfer coefficient of the bed maintained at a high value, and surging of upper dense phase level, severe pressure drops throughout the bed and other undesirable conditions in the bed substantially avoided, and the bed is maintained in a well fluidized state. It has been found that if the powdered iron catalyst average size is maintained within the limits of 30–50 microns, the heat transfer coefficient of the catalyst will be high, the conversions will be constant, and selectivities will be high at high feed rates, the process will be adapted for most economical operation and will otherwise result in improved operation.

"Average particle size" or average catalyst size as herein employed is illustrated by the below relationship which defines the average particle size:

$$D = \frac{W}{\sum \frac{m'}{d'} + \frac{m''}{d''} + \cdots \frac{m^n}{d^n}}$$

W is the weight of iron catalyst in the reactor.
$m'$, $m''$, etc., is the weight of a particular particle size fraction.
$d'$, $d''$, etc., is the average particle size of the particle constituting that particular fraction.
$\Sigma$ is summation of the $$\frac{m}{d}$$

terms.
D is the over-all average particle size.

To illustrate, assume 100# of iron catalyst. Then assume that the particle size distribution was as follows:

| | |
|---|---|
| 0–20 mu | 10# |
| 20–40 mu | 20 |
| 40–80 mu | 60 |
| 80–100 mu | 10 |
| | 100# |

Filling in these value in the foregoing equation, one would obtain the following:

$$D = \frac{100}{\frac{10}{10} + \frac{20}{30} + \frac{60}{60} + \frac{10}{90}} = 36$$

In carrying the invention into effect, the catalyst is maintained within the limits of average size set forth above, by continuously, or at least at frequent intervals withdrawing catalyst, removing carbon by combustion or sintering, regrinding the catalyst to a size, usually larger than 30–50 microns, which is dictated by a correlation of catalyst regeneration rate with average particle size of catalyst to be added in order to maintain 30–50 average micron size, other operating conditions being held substantially constant. (The oversized particles disintegrate to the desired size.)

An object of the present invention, therefore, is to operate a hydrocarbon synthesis plant with continuous addition and withdrawal of catalyst, employing a bed of fluidized iron as the catalyst under conditions conducive to maximum efficiency.

Another object of the invention is to operate a hydrocarbon synthesis process employing a fluidized bed of iron catalyst under conditions such that the operation can be carried out for a longer period of time at approximately constant conversion and constant catalyst volume without catalyst addition but with catalyst withdrawal.

A further object of the invention is to improve the iron catalyst life.

Other and further objects of the invention will appear from the following more detailed description and claims read in conjunction with the accompanying drawing.

To the accomplishment of the foregoing and related ends, the invention may be carried into effect in accordance with the description immediately following.

In the accompanying Figure I there is shown diagrammatically, an apparatus layout in which a preferred modification of the present invention may be carried into effect.

Referring in detail to Figure I, I represents a reactor which is in the form of a cylinder having a conical base and a convex crown. There is shown contained in the reactor a fluidized bed of powdered iron catalyst C. As shown, the fluidized bed of catalyst has an upper dense phase level L, above which there is a dilute phase S. Usually there is a plurality of centrifugal separators 2 through which the gasiform material about to issue from the reactor is forced for the purpose of separating therefrom entrained material, which material is then returned to the dense phase through dip pipes 3. In the feed to the reactor the principal constituents are carbon monoxide and hydrogen. These are charged to the reactor through line 4 at a suitable pressure, usually within the range of 200–700 pounds per square inch, passed upwardly within the reactor through a grid or screen G and thence are forced into the fluidized bed of catalyst. The catalyst bed temperature is maintained within the limits of from about 575–725° F. and the feed rate is such that sufficient contact between catalyst and gasiform reactants is maintained. Usually this is accomplished by feeding the gasiform reactants to the reactor at a rate of from about 10–300 volumes of standard gas per pound of catalyst in the reactor per hour. It should be pointed out that the superficial linear velocity of the gas passing through the reactor is from ½–1½ feet per second where the catalyst has a particle size of from 0–200 microns overall, but has an average particle size of from 30–50 microns. By "superficial velocity" reference is made to the gas velocity in the reactor at the conditions of temperature and pressure prevailing therein, were there no catalyst in the reactor. Actually, of course, the velocity is higher since the reactor does contain catalyst.

The catalyst itself may be derived from a plurality of sources. It may be, for example, re-sintered pyrites ash, synthetic ammonia catalyst (fused magnetite promoted with alumina and potassia), various reduced oxidic ores, sintered, reduced red iron oxide, etc. Usually, in starting the operation the catalyst is reduced substantially to the metallic state, with say hydrogen, in situ, and thereafter, the reactor is put on stream by discontinuing the hydrogen feed and replacing it with a fresh feed gas containing hydrogen and carbon monoxide in the ratio of say, one to two mols of hydrogen per mol of carbon monoxide. The catalyst contains a minor proportion of an alkali metal promoter, say 1–2% of $K_2CO_3$, KF, $Na_2CO_3$, etc. Under the conditions stated, the desired reaction occurs and the product is withdrawn through line 5 as previously indicated and delivered to cooling and distilling equipment to recover gasoline, gas oil, heavy or light hydrocarbons and, also oxygenated compounds in conventional product recovery equipment represented by 6. This takes the form of condensers, fractional distillation towers, etc. This purification of the raw product does not go to the heart of the present invention and the details thereof are well known to those familiar with this art. Unconverted hydrogen and carbon monoxide may be recycled to the reaction zone, if desirable or necessary, and even some of the carbon dioxide may be recycled. The gasoline, gas oil, oxygenated hydrocarbons (e. g., alcohols, acids, etc.) are recovered and refined further, if necessary, in conventional equipment (not shown).

Referring again to reactor 1, the same is provided with a drawoff line 7 provided with a control means, such as slide valve 8, to provide means for withdrawing catalyst from the reactor as desired. This drawoff line 7 is usually provided with jets or taps through which a gas may be injected for the purpose of insuring smooth flow from the reactor. The purpose of withdrawing catalyst from the reactor is substantially to free the catalyst from carbonaceous deposits and this may be accomplished by permitting the withdrawn catalyst to move by natural flow into regeneration vessel 10 where it is treated with an oxygen-containing gas, such as air, in order to burn off the carbonaceous deposits. The regenerator 10 may have the same general form and construction as vessel 1 although it may be somewhat smaller in size. A good way to operate the vessel is to charge air from line 11 into the bottom of the reactor, cause it to flow upwardly through the grid $G_1$ into a mass of catalyst C at a superficial velocity of say, ½ to 1½ feet per second, and cause the formation of a second fluidized bed of catalyst in the regenerator 10 having an upper dense phase level at $L_1$ and a superimposed dilute phase $S_1$. Under the influence of the air, the carbonaceous deposits are burned and the resulting fumes pass through dilute phase $S_1$, thence through two or more centrifugal separators 2' wherein entrained catalyst is separated and returned through two or more dip pipes 3' to the dense phase, while the fumes are withdrawn overhead through line 12 and since these fumes may be at a temperature as high as 100° F. or 1100° F. their sensible heat may be recovered by passing them through a wasteheat boiler or otherwise employing them to recover whatever energy they contain, in conventional equipment (not shown). The regenerated catalyst is withdrawn from generator 10 through line 13 controlled by a valve or other flow control means 14, then passed to cooler 20 and thence to sintering machine 15 wherein the regenerated catalyst is subjected to sintering temperatures in the range of 2000°–2500° F. The sintered catalyst is then passed to quenching zone 17 and classification unit 16, wherein, in a manner known per se, the sintered catalyst may be ground and classified. Catalyst of the desired particle size range may be withdrawn from 16, passed to reducer 18, wherein it is treated with a hydrogen-containing gas, thence discharged into a stream of gas containing carbon monoxide and hydrogen where it is formed into a suspension which may then be carried to line 4 and with the feed gas in that line into the reactor 1.

It is pointed out that cooling of the catalyst withdrawn from the regenerator 10 will be necessary, and this may be accomplished by causing the catalyst to flow through a heat-exchanger or other suitable cooling means to abstract heat and lower the catalyst temperature to 700° F. or thereabout. Drawoff line 13 may be provided with taps through which an "aeration" or fluidizing gas is injected for the purpose of maintaining the proper smooth flow of catalyst through said drawoff line.

Those skilled in this art will appreciate that reactor 1 must be provided with cooling means (not shown) for the reaction is highly exothermic. A good method of cooling is to dispose within the fluidized bed a coil containing a circulating cooling medium which is forced through the coil in heat exchange relationship with the fluidized iron bed for the purpose of abstracting heat therefrom.

In Figure II there is depicted graphically the relationship between particle size, bulk and bed density, bed volume, heat transfer coefficient, and days on stream is set forth for the case wherein catalyst is continuously withdrawn to maintain constant conversions but no additional catalyst is added. It will be recalled that one of the objects of the present invention was to operate a hydrocarbon synthesis plant employing a fluidized bed of iron under conditions such as to maintain high efficiency, i. e., obtain high and constant conversions of CO and $H_2$ and good heat transfer efficiency. It was also pointed out that the bed density is related to the heat transfer coefficient of the said bed. In other words, the lower the bed density the lower the heat transfer coefficient, which means, of course, that it would be more difficult to maintain proper temperatures. Bed density in turn is related to average particle size, the smaller the particles the lower the bed density for a given gas velocity. Considering first the heat transfer coefficient, it will be noted that where the average particle size of a catalyst is above 40, the heat transfer coefficient is fairly constant during a period of about 35–40 days, whereupon it drops off rather sharply as the average particle size decreases. The shape of the bulk density curve, i. e., the density of the catalyst in "unaerated" or non-fluid form, follows the general shape of the bed density as the average particle size decreases and, furthermore, it will be noted that as time goes on the percent of carbon on the catalyst is increased. This, of course, is true when the catalyst is removed to maintain constant conversion but larger size catalyst is not added. As a corollary to this latter it is also noted that the average particle size decreases as time goes on during the operation, and the weight of the catalyst in the reactor varies directly with the particle diameter.

It may be noted from Figure II that the catalyst volume for a given conversion is at a minimum, i. e., operation with maximum efficiency, after about 37 days in the reactor. This corresponds to an average particle diameter of about 40 microns when starting with an average particle diameter of 80 microns. It may also be noted that for an average catalyst diameter of 40 microns that bulk and bed densities and heat transfer coefficients are still quite high and good fluidization will be obtained. Hence it follows that by adding oversize catalyst to a bed of 40 microns and withdrawing catalyst of an average size from the reactor, the desired particle size in the reactor may be maintained, providing proper correlation is made among operating conditions, catalyst replacement and withdrawal rates, and the average size of the replacement catalyst.

To sum up, therefore, the teaching of the invention as interpreted by the curves in Figure II is to the effect that the average particle size of the catalyst should be maintained within the limits of approximately 30–50 microns for most satisfactory operation, by adding material having a size greater than 30–50 microns, the exact size depending upon the replacement rate and other operating variables as determined by the correlation indicated previously, the material disintegrating during the process to the 30–50 micron size. The present invention teaches that this can be accomplished by withdrawing catalyst, removing carbon, resizing, and returning the regenerated catalyst to the reaction zone.

In order to illustrate the invention, the following illustrative examples are given. The synthesis conditions upon which Figure II is based are given in the table below.

OPERATING CONDITIONS

*Catalyst*: "Ammonia Synthesis" (*Fused magnetite containing alumina and a promoter*)

| | |
|---|---|
| Temperature, °F. | 650 |
| Pressure, p.s.i.g | 410 |
| $H_2/CO$ ratio, fresh feed | 1.5 |
| Total recycle ratio | 1.47 |
| Gas velocity, ft./sec. | 1.5 |
| Fresh feed, MMSCFD: | |
| $H_2$ | 201.3 |
| CO | 134.2 |
| $CO_2$ | 10.1 |
| $N_2$ | 9.3 |
| $H_2O$ | 0.8 |
| $CH_4$ | 10.7 |
| Total | 366.4 |
| Per cent $H_2$ in total feed | 34.4 |
| $H_2$ conversion, per cent | 98.0 |
| CO conversion, per cent | 92.0 |
| Avg. particle size in reactor, microns | 32 |
| Carbon formation rate, lbs./day | 16,800 |
| Lbs. iron in reactor | 1,113,000 |
| Bulk density, lbs./cu. ft. | 128 |
| Bed density, lbs./cu. ft. | 84 |
| Heat transfer coefficient | 265 |
| Yields: | |
| Gasoline, B/D | 9,765 |
| Gas oil, B/D | 1,376 |
| Oxygenated material, B/D | 1,502 |

With the above reaction conditions and conversion levels, three cases wherein the replacement rate of catalyst is varied are considered, catalyst being continuously removed and replaced.

| | Case I | Case II | Case III |
|---|---|---|---|
| Replacement Rate, Lbs./Day | 49,500 | 120,000 | 192,000 |
| Percent Carbon on iron in reactor | 34 | 14 | 8.75 |
| Replacement Catalyst, Average size, Microns | 108 | 50 | 39 |

The above table shows that in order to maintain the 32 micron average particle size in the reactor, the average size of the replacement catalyst is a function of the replacement rate. The table gives the replacement size necessary in accordance with the replacement rate.

When catalyst is withdrawn to maintain constant conversion under operating conditions, the following is observable, starting with catalysts of 80 and 40 microns average size, respectively.

| | Case I | | Case II | |
|---|---|---|---|---|
| Days of Operation | 0 | 55 | 0 | 17 |
| Avg. Size of Catalyst, Microns | 80 | 22 | 40 | 22 |
| Heat Transfer Coefficient | 335 | 210 | 285 | 210 |
| Aerated Density, Lbs./Cu. Ft. | 154 | 41 | 130 | 41 |
| Iron in Reactor, Lbs. | 2,790,000 | 765,000 | 1,395,000 | 765,000 |
| Bulk Density, Lbs./Cu. Ft. | 165 | 88 | 148 | 83 |
| Percent Carbon on Iron | 0 | 62 | 0 | 27 |
| Avg. Catalyst Make-up Rate, Lbs./Day | | 50,800 | | 72,000 |

These data indicate the relative faster rate of disintegration of the smaller (40 micron) as against the larger (80 micron) particles, and show that in the case of the smaller particle the catalyst make-up rate requirements are substantially greater than for the 80 micron initial average particle change.

Besides the continuous catalyst removal and replacement process discussed heretofore, it may be advantageous under certain circumstances to employ a batch process. In such batch operation it has been determined that there is an optimum size of catalyst to be introduced to the reactor for most economical operation, specifically a catalyst containing 5–7% by weight of a 0–20 micron fraction, or 60–80 average micron catalyst size. The combined effect of the changes resulting from disintegration of the catalyst, such as decreased particle size giving an increase in aerated volume, increased catalyst surface area affording higher activity and conversion, and increased aerated volume increasing operational difficulties make the catalyst size distribution above advantageous. This optimum average catalyst size enables the operation to be carried out for longer periods of time at approximately constant conversions and catalyst volumes.

If the operation is started with average size catalyst and size distribution finer than the 5–7% 0–20 micron size specified and, as disintegration occurs, some catalyst is withdrawn to maintain a constant conversion (since conversion rises as a result of increased surface area), the catalyst aerated volume continues to rise until it soon destroys operability. In this case enough catalyst could be withdrawn to hold the volume constant, but lowered conversion would result.

Starting with a catalyst of the optimum average particle size and distribution and withdrawing catalyst to maintain conversion constant, the catalyst volume first decreases as a result of said withdrawal, then rises again when the catalyst size distribution is such that 20-30% of the particles have diameters 0-20 microns. In this manner constant conversion and catalyst volumes are maintained for substantial periods of time.

If the operation is started with catalyst larger in size than the optimum specified the decrease in volume resulting from the withdrawal to maintain conversion is of too great a magnitude, and the benefit of an essentially constant volume is lost.

Thus in a batch operation it is possible to operate for an extended period of time at constant conversion and catalyst volume, if the operation is started with a catalyst having an average particle size of 60-80 microns and containing 5-7% 0-20 micron material.

From consideration of the time, catalyst volume, particle size relationships for the optimum conditions specified, it can be seen that the optimum particle size to be maintained in the reactor is 30-50 microns. At this particle size the catalyst volume is at a minimum, i. e., least catalyst is required to obtain a given conversion and at the same time maintain good heat transfer. Furthermore, the best fluidizing conditions obtain with catalyst of that size distribution.

Replacement catalyst, therefore, should be added to a fluidized bed continuously at a rate which varies with the size of the particles added, to maintain an average particle size in the bed of 30-50 microns. This affords optimum conditions for obtaining a desired conversion with the least catalyst volume necessary to maintain good heat transfer conditions and good fluidization.

To recapitulate, the present invention is based on the concept that high yields of desired products may be obtained by charging a mixture of gases containing carbon monoxide and hydrogen to a reaction zone containing a fluidized bed of powdered iron catalyst having an average particle size of from 30-50 microns, for such a bed provides the largest degree of surface obtainable with good catalyst fluidizing characteristics including good heat transfer efficiency, maintaining a substantially constant upper dense phase level and a substantially constant volume of aerated catalyst in the reactor, the avoidance of substantial differences in temperature throughout the reaction zone and various other desirable attributes. Moreover, it is possible to maintain such an average particle size by proper correlation of operating variables, catalyst replacement rate, and size of catalyst added. It is also an advantage of the present invention that since the particle size is maintained within the limits specified and permits a relatively high feed rate to the reaction zone which, of course, means that the plant can be operated at a higher capacity and in the same connection for a longer period of time.

Numerous modifications of the invention not specifically disclosed herein but falling within the spirit of the invention may be made by those familiar with the art.

What is claimed is:

1. In the synthesis of hydrocarbons from carbon monoxide and hydrogen using a fluidized iron-type catalyst consisting of 40 to 200 micron-size solid particles having a weight mean average particle diameter in excess of 50 microns, the method of obtaining the maximum conversion of reactants per unit catalyst volume which comprises maintaining a fluid catalyst having a weight mean average catalyst particle size of from about 30 to 50 microns by adding said particles of 40 to 200 micron size to a fluid bed of more finely divided catalyst maintained within a reaction zone under synthesis conditions of temperature, pressure and synthesis gas feed, continuously withdrawing from said reaction zone catalyst particles containing carbonaceous material, controlling the rate of said catalyst addition as an inverse function of the average particle size of the catalyst added, and maintaining continuously over an extended period of time within the fluid bed a catalyst of high activity having the desired 30 to 50 micron average particle size, whereby the synthesis gas feed rate for a given feed conversion may be maintained higher than in a bed of said catalyst having the same volume wherein said particle size averages either larger than about 50 microns or smaller than 30 microns.

2. The process of claim 1 wherein the average particle size of the iron catalyst within said dense bed is about 40 microns.

3. The process of claim 1 wherein said withdrawn catalyst is not replaced.

4. The method set forth in claim 1 in which the catalyst withdrawn from the reaction zone is subjected to a sintering step for the purpose of removing carbonaceous deposits and thereafter resized and returned to the reaction zone.

5. The method of claim 4 in which a sintered catalyst is ground and that portion thereof having an average particle size of from 60-80 microns is returned to the reaction zone.

6. The method of claim 4 wherein catalyst is subjected to a treatment with a hydrogen-containing gas prior to return to said reaction zone.

7. The method of claim 4 in which the catalyst withdrawn from the reaction zone is treated with an oxygen-containing gas for the purpose of removing carbonaceous deposits by combustion thereof.

IVAN MAYER.
VIRGINIA C. JOHNSON.

References Cited in the file of this patent

UNITED STATES PATENTS

| Number | Name | Date |
| --- | --- | --- |
| 2,467,803 | Herbst | Apr. 19, 1949 |
| 2,479,420 | Segura | Aug. 16, 1949 |